United States Patent [19]

Komuro

[11] Patent Number: 4,726,203

[45] Date of Patent: Feb. 23, 1988

[54] LOCKING DEVICE FOR ACCESSORY COMPARTMENTS OF TWO-WHEEL VEHICLES

[75] Inventor: Katsusuke Komuro, Tokyo, Japan

[73] Assignee: Honda Giken Kogyo Kabushiki Kaisha, Tokyo, Japan

[21] Appl. No.: 759,576

[22] Filed: Jul. 26, 1985

[30] Foreign Application Priority Data

Jul. 26, 1984 [JP] Japan ................................ 59-155761

[51] Int. Cl.⁴ ................................................ F16P 3/00

[52] U.S. Cl. ...................................... 70/263; 292/144; 70/275

[58] Field of Search ................. 70/263, 264, 262, 275; 292/144, DIG. 72

[56] References Cited

U.S. PATENT DOCUMENTS

| | | | |
|---|---|---|---|
| 332,343 | 12/1885 | Horn et al. | 292/DIG. 72 |
| 3,070,183 | 12/1962 | Horton | 70/264 |
| 3,247,924 | 4/1966 | Price | 70/263 |
| 3,630,305 | 12/1971 | Kazaoka | 70/264 |
| 3,633,391 | 1/1972 | Andres et al. | 70/264 |
| 4,353,230 | 10/1982 | Cacioni | 70/263 |

FOREIGN PATENT DOCUMENTS

| | | | |
|---|---|---|---|
| 2400474 | 8/1974 | Fed. Rep. of Germany | 292/144 |

*Primary Examiner*—John E. Murtagh
*Assistant Examiner*—Caroline D. Dennison
*Attorney, Agent, or Firm*—Sughrue, Mion, Zinn, Macpeak, and Seas

[57] ABSTRACT

A locking device especially useful in locking accessory compartments of motorcycles and the like. Each accessory compartment is provided with a lock mechanism including a pressure-actuated cylinder, a locking member fixed to a piston of the cylinder, and locking fittings through which the locking member projects in the locked position. Pressurized air is supplied to the cylinders to unlock the compartments from a three-way control valve located in a key-lockable compartment.

6 Claims, 6 Drawing Figures

LOCKING DEVICE FOR ACCESSORY COMPARTMENTS OF TWO-WHEEL VEHICLES

BACKGROUND OF THE INVENTION

The present invention relates to a locking device, specifically, to a locking device adapted for locking the trunk, side bags, etc., (hereinafter referred to as "accessory compartments") of a two-wheel vehicle such as a motorcycle.

For the purpose of locking the accessory compartments of a two-wheel vehicle it has been the customary practice to employ standard key-type locks. However, key-type locks are especially inconvenient in a motorcycle environment where keys can easily be lost and are difficult to use because the rider often wears gloves. Accordingly, it has long been felt necessary to improve the locking devices used for accessory compartments of motorcycles and the like. In one such approach, electromagnetic solenoid valves have been employed in automatic locking devices, but are not entirely suitable for use on motorcycles due to their relatively large size, high cost and heavy weight.

Therefore, it is a primary object of the present invention to provide a locking device for a two-wheel vehicle which avoids the above-mentioned difficulties.

SUMMARY OF THE INVENTION

These, as well as other objects of the invention are met by a locking device for locking accessory compartments for two-wheel vehicles and the like, comprising a source of pressurized fluid, pressure-operated locking means for locking a cover of a compartment when pressure supplied thereto is below a predetermined level and unlocking the cover of the compartment when the pressure supplied thereto is above the predetermined level, and control means for controlling a flow of pressurized fluid from the source to the locking means. Preferably, the locking means comprises a pressure cylinder having a piston slidably fitted therein, a locking member fixed to the piston, and means for coupling an outlet of the source to a piston chamber of the pressure cylinder. A lock fitting is fixed to the cover, the lock fitting having formed therein a hole for receiving an end of the locking member in a locked position of the locking member, and first and second retainer fittings and fixedly coupled to a main body of the compartment, the retainer fittings having holes located opposite one another for receiving an end of the locking member in the locked position of the locking member, and the retainer fittings defining a slot therebetween for receiving the lock fitting. The control means may comprise a three-way valve including a valve housing having an inlet port and first and second discharge ports, the inlet port being coupled to an outlet of the source, the first discharge port being coupled to the piston chamber, and the second discharge port being vented to the atmosphere, a valve body slidably disposed in the valve housing, the valve body having a first position in which the inlet port is blocked and the first and second discharge ports and connected together, and a second position in which the inlet port is connected to the first discharge port, and the valve body having an operator-actuable head portion for manually moving the valve body between the first and second positions, and a spring biasing the valve body towards the first position.

Preferably a key-lockable compartment is provided in which the control means is disposed.

DESCRIPTION OF THE PREFERRED EMBODIMENTS

Preferred embodiments of a locking device of the present invention will be described with reference to FIGS. 1 through 6 of the accompanying drawings.

Figure 1:
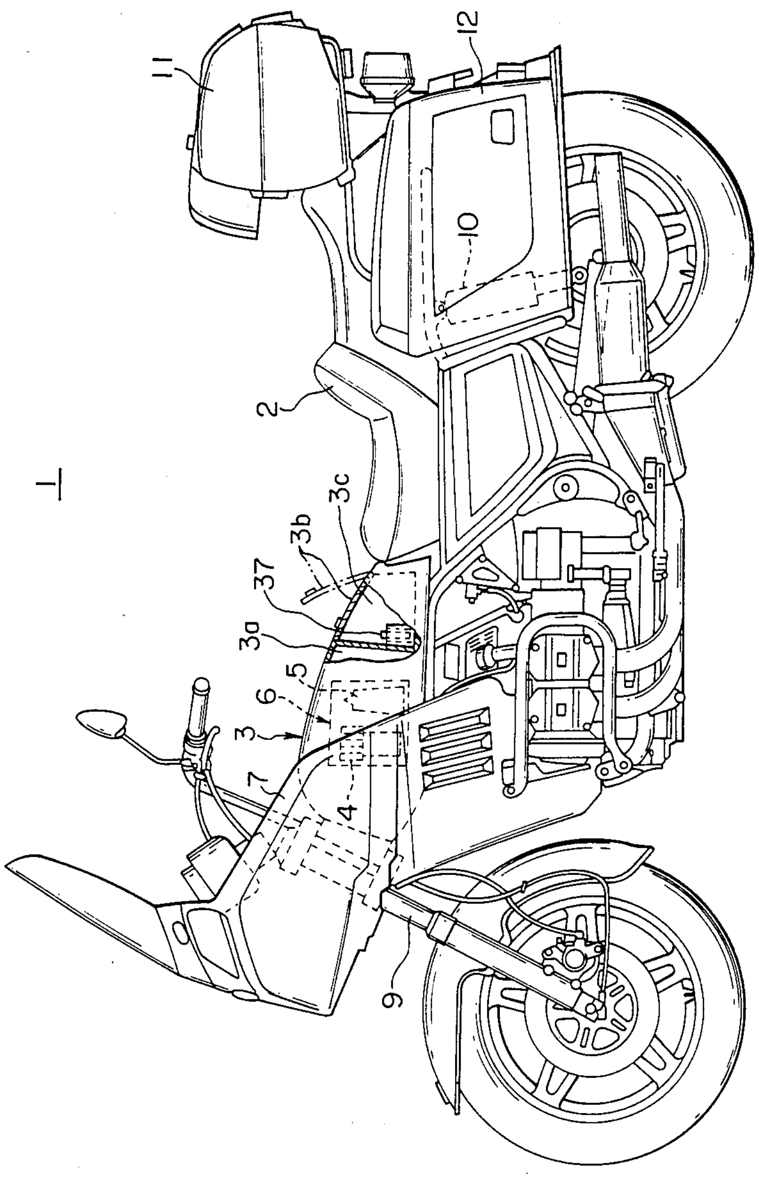
FIG. 1 is a side view of a motorcycle on which a locking device of the present invention is installed.
Figure 2:
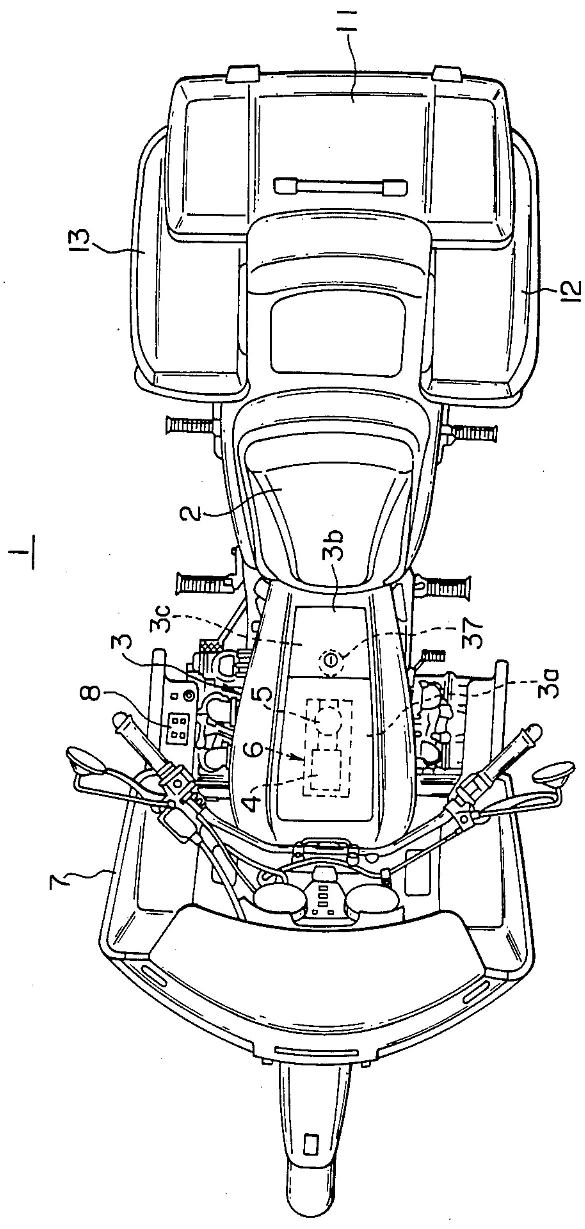
FIG. 2 is a plan view of the vehicle of FIG. 1.
Figure 3:
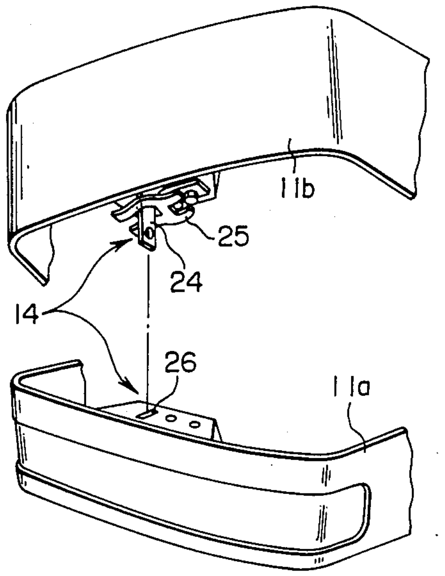
FIG. 3 is a perspective view showing the manner in which a trunk cover is engaged with a main body.
Figure 5:
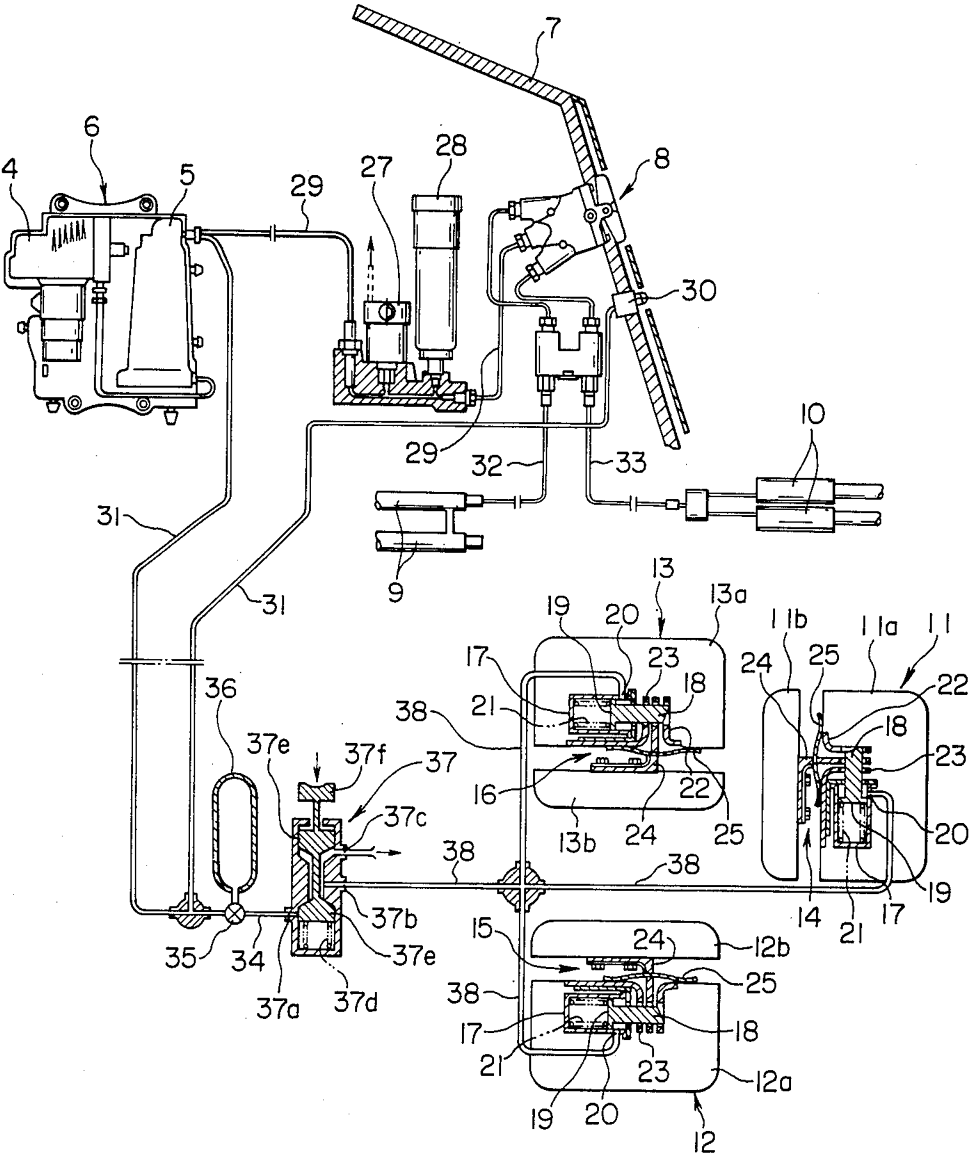
FIG. 5 is a piping connection diagram.

A motorcycle 1 shown in FIGS. 1, 2, and 5 is equipped with plural accessory compartments, including a compartment 3 located forward of a seat 2. In a chamber 3*a* of the compartment 3 is disposed an air compressor 6 driven by an air pump 4. Compressed air expelled from the air compressor 6 is dehumidified by a drier 5. Suspension components 9 and 10 for the front and wheels, respectively, are adjusted by controlling the flow of pressurized air thereto by a switch located on a central control panel 8, FIG. 2, disposed rightwardly of a front cowl 7.

The accessory compartments of the motorcycle further include a rear trunk 11 and right and left side bags 12 and 13, respectively, carried rearwardly of the seat 2. Locking devices 14, 15, and 16 are provided for these respective accessory compartments. Each of the locking devices 14, 15, and 16 has the same construction. As an example, the locking device 14 for the trunk 11 will be described with reference to FIGS. 3 and 4.

An air cylinder 17 is mounted on a main body 11*a* (a portion of the compartment which is rigid with the frame of the motorcycle, that is, other than the movable lid or cover of the compartment). In the air cylinder 17 is slidably fitted a piston 19, the latter being integrally formed with a locking member 18. A pressure chamber 17*b* is defined on the side of the piston 19 where the locking member 18 is located. An air supply port 20 communicates with the chamber 17*b*. A spring 21, disposed in a rear chamber 17*c*, urges the locking member leftwardly in the drawing. The forward end of the locking member 18 has an inclined surface 18*a* normally inserted in holes 22*a* and 23*a* in guide segments 22 and 23, respectively, also rigidly secured to the main body 11*a*.

A cover 11*b* is provided with a retainer fitting 24 having a locking member receiving hole 24 formed therein. A spring 25 lightly lifts the cover 11*b* in the unlocked state. The retainer fitting 24 is fitted in a slot 26, FIG. 4, formed between the guide segments 22 and 23 in the locked state.

Reference numerals 12*a* and 13*a* identify the main bodies of side bags 12 and 13, respectively, and 12*b* and 13*b*, their corresponding covers.

The operation of the locking device 14 arranged as described above will now be explained.

To lock the cover 11*b*, the cover 11*b* is pushed so as to force the retainer fitting 24 into the slot 26 so that the forward end of the retainer fitting 24 presses against the inclined surface 18*a* at the end of the locking member 18, thereby retracting the locking member 18 and moving the piston 19 against the force of the spring 21 (rightwardly in the drawing). When the holes 22*a* and 23*a* are in alignment with the hole 24*a*, the spring 21 forces the locking member 18 towards the hole 22*a* (leftwardly in the drawing), thereby achieving the locked state.

When the cover is to be unlocked, compressed air is supplied via the supply port 20 to the chamber 17*b* to thus cause the locking member 18 and the piston 19 to be retracted against the force of the spring 21, thereby moving the locking member out of engagement with the hole 24*a* in the fitting 24, and thus releasing the locked state. The light force of the spring 25 then lifts the cover 11*b*.

Next, an example of the piping system used to supply compressed air to the air cylinder 17 will be described.

A first segment of a line 29, FIG. 5, is connected between a control valve 27, which includes an air pressure sensor 28, and a switch on the central control panel 8, while a second segment of the line 29 receives compressed air at the outlet of the drier 5. A first segment of another line 31 is connected between a valve 30, used to control the flow of air to the tires, and a T connector, while a second segment of the line 31 is connected between the T connector and the outlet of the drier 5. The outlet of the T connector is coupled to a line 34 via a check valve 35, associated with an accumulator 36, and thence to the inlet port 37*a* of a three-way control valve 37. The control valve 37 has two discharge ports 37*b* and 37*c*. A valve body 37*e* is normally urged by a spring 37*d* into a position in which the inlet port 37*a* is closed and a line 38, connected to the discharge port 37*b*, is communicated with the discharge port 37*c*, which is open to the atmosphere. The line 38 is connected via a distributor to the supply ports 20 of each of the locking devices 11, 12 and 13. Therefore, in this position, the supply ports 20 are communicated with the atmosphere, and hence the locking devices are in their locked states. In the other position of the valve body 37*e*, air can be supplied via the lines 31 and 34 to the supply ports 20, hence placing the locking devices 11, 12 and 13 in their unlocked states.

Also, lines 32 and 33 are connected between the control switch panel 8 and the suspension components 9 and 10.

As shown in FIGS. 1 and 2, the three-way valve 37 is mounted in a receptacle 3*c* of the compartment 3 which can be locked with an ordinary key-type lock. The central control panel, as showwn in FIG. 6, carries a switch SW1 for supplying compressed air to the front suspension, a switch SW2 for supplying air to the rear suspension, a control switch SW3 for the air pump 4, and a purge switch SW4 for the control valve. The tire pumping valve 30 and the switch SW3 are mounted below the panel 8. A hose is coupled to the valve 30 for carrying air for the tires.

Figure 6:
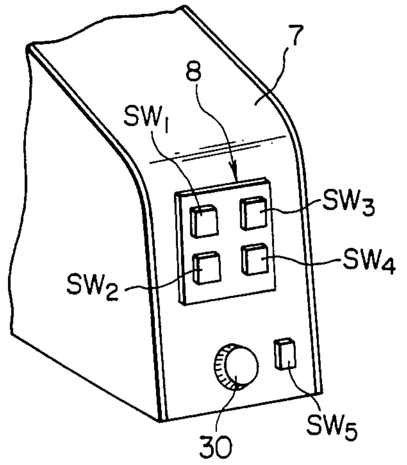
FIG. 6 is a perspective view illustrating the manner in which a central switch panel is mounted.
Figure 4:
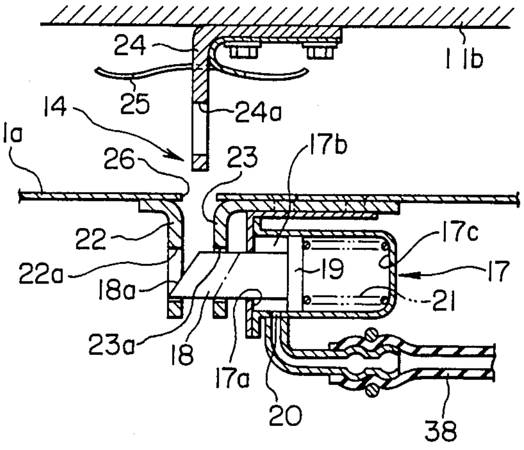
FIG. 4 is a sectional view of a locking device of the invention.

To unlock the various accessory compartments, first, the cover 3*b*, FIG. 1 of the compartment 3*c* is unlocked using a key. At the same time, the switch SW3, FIG. 6, is actuated to turn on the air pump 4, thus supplying pressurized air from the air compressor 6 to the three-way valve 37. Then the valve 37 FIGS. 1, 5, is actuated by manually pressing down upon its head portion, thereby supplying air to the various cylinders 17. Assuming that the pressure of the pressurized air is above a level to overcome the force of the spring 21, the various locking devices are placed in their unlocked state in the manner described above. That is, pressurized air is supplied through the line 38 to the various cylinders 17, causing the pistons 19 to be retracted against the force of the springs 21, and thus retracting the locking members 18. To again lock the locking devices, the valve 37 is merely released, whereupon the flow of pressurized air to the cylinders 17 is halted. The locking members and associated pistons are then pushed towards the locked position by the action of the springs 21. The pressurized air from the cylinders 17 is vented through the discharge port 37*c* of the valve 37.

Although the above-described embodiment has been discussed with reference to the case where an air compressor is employed as the pressure generating source, it is believed apparent that a hydraulic pump can be used as well. Moreover, the present invention is equally applicable to burglar-proofing devices such as steering locking devices and the like. Further, the invention can be applied to vehicles other than two-wheel vehicles.

This completes the description of the preferred embodiments. Although preferred embodiments have been described, it is believed that numerous modifications and alterations thereto would be apparent to one of ordinary skill in the art without departing from the spirit and scope of the invention.

I claim:

1. A locking device for locking a cover to each of plural externally accessible accessory compartments of a motor cycle, respectively, said locking device comprising:
- a source of pressurized fluid;
- pressure-operated locking means for locking respective covers of said externally accessible accessory compartments, conduit means for connecting said source of fluid pressure to said pressure-operated locking means such that the covers are locked when the pressure supplied thereto is below a predetermined level and unlocked when the pressure supplied thereto is above said predetermined level;
- control means for controlling the flow of pressurized fluid from said source to said locking means within said conduit means;
- a key-lockable externally accessible compartment in which said control means is disposed; and
- externally accessible switch means within said conduit means for selectively actuating said source of pressurized fluid, said switch means being located on an externally accessible control panel whereupon, by actuation of said switch means and operation of said control means, fluid pressure is supplied to said pressure-operated locking means for unlocking said covers.

2. The locking device of claim 1, wherein said locking means comprises:
- a pressure cylinder having a piston slidably fitted therein;
- a locking member fixed to said piston; and
- means for selectively coupling an outlet of said control means to a piston chamber of said pressure cylinder.

3. The locking device of claim 2, wherein said locking means further comprises:
- a lock fitting fixed to said cover, said lock fitting having formed therein a hole for receiving an end of said locking member in a locked position of said locking member; and first and second retainer fittings fixedly coupled to a main body of said compartment, said retainer fittings having holes located opposite one another for receiving an end of said locking member in said locked position of said locking member, and said retainer fittings defining a slot therebetween for receiving said lock fitting.

4. The locking device of claim 2, wherein said control means comprises a three-way valve.

5. The locking device of claim 4, wherein said three-way valve comprises:

a valve housing having an inlet port and first and second discharge ports, said inlet port being coupled to an outlet of said source, said first discharge port being coupled to said piston chamber, and said second discharge port being vented to the atmosphere;

a valve body slidably disposed in said valve housing. said valve body having a first position in which said inlet port is blocked and said first and second discharge ports and connected together, and a second position in which said inlet port is connected to said first discharge port, and said valve body having an operator-actuable head portion for manually moving said valve body between said first and second positions; and a spring biasing said valve body towards said first position.

6. The locking device of claim 1, wherein said source comprises an air compressor.

* * * * *